Feb. 22, 1966 A. BARTOSZAK 3,235,959
BRAZING ALUMINUM BASED PARTS
Filed June 25, 1962
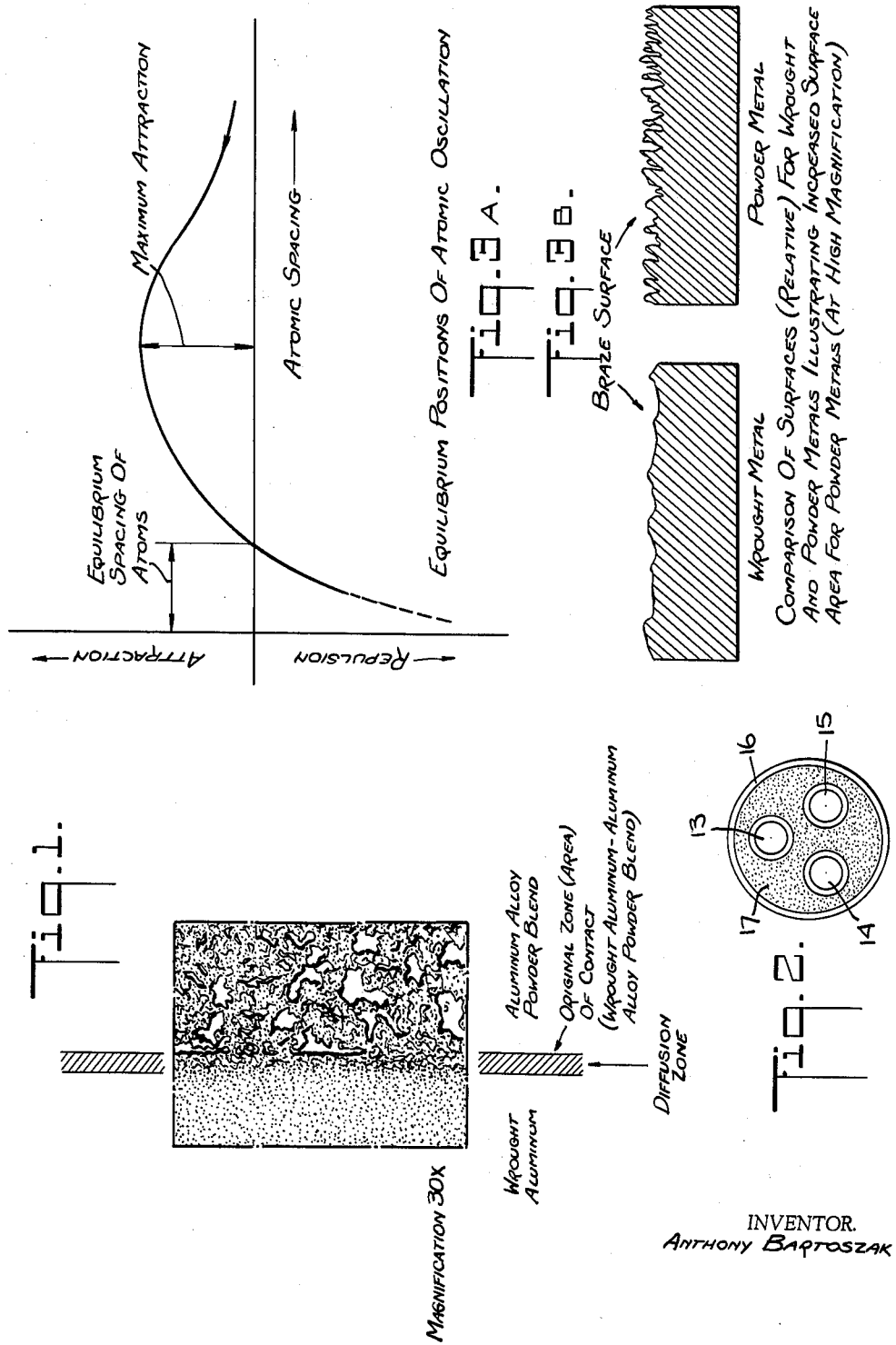
INVENTOR.
ANTHONY BARTOSZAK

3,235,959
BRAZING ALUMINUM BASED PARTS
Anthony Bartoszak, Brooklyn, N.Y., assignor to Alloys Research & Manufacturing Corporation, New York, N.Y., a corporation of Delaware
Filed June 25, 1962, Ser. No. 204,805
5 Claims. (Cl. 29—498)

This invention relates generally to brazing techniques and more particularly to a method making use of aluminum-copper powder mixtures for furnace brazing of powder-metallurgical parts to themselves and to wrought parts.

Brazing is a term usually applied to a method for joining metals with alloys of copper which melt at temperatures appreciably below the melting points of the metals to be joined. The selection of the best brazing alloy depends on many different factors, but, in general, brazing alloys are classified by their melting points.

It has heretofore been difficult to effect braze bonding of aluminum alloy, particularly in the cases of Al–Cu, Al–Zn or Al–Si cast or wrought materials, mainly because of the problems inherent in the low melting eutectic structures formed.

Furthermore, conventional brazing techniques require the use of fluxes containing halides which are highly corrosive in nature. This leads to a number of difficulties in brazing powder metallurgy parts as well as wrought parts. The first difficulty is that the corrosive fluxes can cause damage to furnace parts and heating elements. Another difficulty has arisen in brazing powder-metallurgy parts and that concerns entrapment of the corrosive flux. In any event when fluxes are used, it is always necessary to utilize post-braze cleaning in hot water and acid solutions. It has also been found that in brazing or soldering powder metallurgy parts, filler metals that have been tried show a tendency to infiltrate the porous parts and not penetrate and bond the joint adequately.

Accordingly, it is the main object of this invention to provide a brazing method which overcomes the drawbacks incident to prior methods and which is capable of effectively bonding metal parts without the use of fluxing agents.

More specifically it is an object of the invention to effect brazing by means of a blend of aluminum and copper powder which in the liquid phase acts to dissolve surface oxides and other contaminants, thereby providing activated areas for solidification and diffusion as the temperature is raised above the eutectic point.

For a better understanding of the invention as well as other objects and features thereof, reference is made to the following detailed description to be read in conjunction with the drawing, wherein:

FIG. 1 is a magnified photograph of a wrought section bonded by a technique in accordance with the invention.

FIG. 2 shows in plan view a cluster of interbonded porous bearings.

FIGS. 3A and 3B are sketches explanatory of the invention.

Referring now to FIG. 1, there is shown in magnified form (30×) a wrought aluminum body which is joined to a porous body by a bond constituted by a diffusion zone. This result is achieved by the use of a thoroughly mixed blend of aluminum powder and copper powder, the relative copper content being about 2% by weight. In practice, powder percentage may range from 1 to 5% by weight, and various mesh sizes may be used such as −325 mesh for the copper and 100/200 mesh for the aluminum.

The copper powder mixture in loose form or green compacted to increase densification, is brought in contact with the wrought section and the combination is heated in a furnace in a temperature range of 625 to 630° C. for about one-half hour in a reducing atmosphere such as hydrogen. It will be seen in the figure that the diffusion zone is clearly indicated, the powder area at the right having porosity and demonstrating that wrought parts can be coated with a porous adherent structure which can then be impregnated with oil, plastic lead or other materials if special properties, such as lubrication are required. This porosity can be controlled and varied by using various powder sizes as well as by differences in compacting pressure, in the manner described in said copending applications. The bond has been found to have excellent strength, for it is possible to machine the sintered material without any fracture occurring at the bond line, thereby indicating the integrity of the joint.

The brazing technique described above has also been used to form an interbonded cluster of three sintered aluminum-copper porous bearings of the type disclosed in said copending applications. To this end, the three bearings 13, 14 and 15 are placed at spaced positions within a tubular metal shell 16, as shown in FIG. 2, and the spaces therebetween are filled with the loose Al–Cu brazing mixture. The assembly is then furnace brazed in a hydrogen atmosphere at about 625° C. for a half hour.

It will be evident that the method disclosed herein can be used for the repair, build-up and/or modification of previously fabricated parts. It can also be used as a means of providing self-lubricating areas on wrought or powder-metallurgy structural parts.

The method disclosed herein solves one of the major problems that has plagued those who would like to join powder parts. The reasons for the successful application of the process are only apparent when one considers the requisites to efficient bonding. Best bonding of atoms occurs when the state of lowest energy (equilibrium) is achieved. This state is related to the interatomic spacing of atoms as depicted in sketch (A) of FIG. 3. The attainment of such a state in bonding is often impeded or retarded as the result of contaminants on the surfaces to be joined. In the case of powder metallurgy parts, surface contamination is a real problem and extensive studies on cleaning and bonding in various furnace atmospheres have been attempted with little or no success. The reason that atmosphere has very little effect is that aluminum oxide is refractory and cannot be reduced at the temperatures used in joining powder parts. Another factor in the case of powder metallurgy parts is the fact that the surface area that must be bonded effectively is greater than in the case of a solid wrought metal part as indicated in sketch (B) of FIG. 3.

In the method in accordance with the invention the liquid Al–Cu phase which forms at 548° C. apparently dissolves the surface oxides and other contamination, thereby providing activated areas for solidification and diffusion as the temperature is raised to 625° C. In other words, it is possible to raise the brazing temperature 77° C. (138.6° F.) above the eutectic temperature with little or no deformation or distortion of parts occurring. During this operation, diffusion occurs and essentially a solid solution structure is formed which has better physical and mechanical properties than the eutectic structure of conventional brazing alloys.

The Al–Cu brazing composition can also be powder rolled into sheets or directly rolled into wrought aluminum sheets to produce braze-clad material for use in brazing large structures such as honeycomb type or fuel element structures as used in the nuclear field. It is also possible to spray the brazing composition on the surfaces to be brazed, assembling and then furnace brazing.

Normal brazing and soldering methods have proved unsatisfactory for other powder metals than aluminum; e.g., iron, bronze, because the filler metals with their low viscosity have a greater tendency to infiltrate the porous parts than to penetrate and bond the joint. It is therefore possible to extend the proposed type of furnace brazing to other powder metals, in that, one can select a low melting system that has significant solid solubility at one end and utilize a brazing composition that contains the solute element in concentrations below the maximum solid solubility composition. Examples of possible brazing compositions for aluminum, iron and copper powder alloys are summarized below for binary brazing compositions although ternary or quaternary compositions would be feasible if restricted in composition to solid solution alloys as stated above.

(1) Aluminum binary systems: Al–Cu, Al–Ge, Al–Li, Al–Mg, Al–Si, Al–Th.

(2) Iron binary systems: Fe–P, Fe–Al, Fe–Sb, Fe–Be, Fe–Co, Fe–Nb, Fe–Ge, Fe–Au, Fe–Cu, Fe–Mo, Fe–Si, Fe–Pd, Fe–Sn, Fe–Ta, Fe–Ti, Fe–V, Fe–Zr, Fe–Ni.

(3) Copper Binary systems: Cu–Al, Cu–Sb, Cu–As, Cu–Be, Cu–B, Cu–Cd, Cu–Cr, Cu–Nb, Cu–Ag, Cu–Ga, Cu–Ge, Cu–In, Cu–Mg, Cu–Mn, Cu–Nb, Cu–P, Cu–Si, Cu–Sn, Cu–Ti, Cu–Zn.

While many of the above may not be used ultimately as binary brazing alloys because of problems such as brittleness, combinations may be used as ternary or quaternary brazing alloys with improved properties. As an example, Al–Ge may not be useful as such, but small amounts of Ge added to Al–Cu, Al–Si or Al–Li might make excellent ternary alloys. In the case of iron, Fe–Mo might not ever be considered useful, but additions of Mo to Fe–P, Fe–Al or other binaries or ternaries may provide improved mechanical strength properties.

It is also simple to apply the above technique to the use of pre-alloyed powders for brazing filler metals. The powders can be used alone or with small additions of elementals such as copper to augment the early stages of bonding.

While there has been shown preferred techniques in accordance with the invention, it is to be understood that many changes may be made therein without departing from the spirit of the invention as defined in the annexed claims.

I claim:

1. The method of brazing comprising applying to a part to be brazed a mixture of aluminum and copper powder wherein the relative copper content is about 1 to 5% by weight, said part having a melting point above the eutectic temperature of said mixture, and heating the combination in a protective atmosphere at a temperature below the melting point of said part and above said eutectic temperature for a period sufficient to produce a diffusion zone between said part and the sintered body of said mixture.

2. The method of brazing comprising applying to a part to be brazed a mixture of aluminum and copper powder having a copper content of about 1 to 5% by weight, heating the combination in a furnace in a temperature range of 625° to 630° C. in a protective atmosphere for a period sufficient to effect bonding, said part having a melting point appreciably above said range.

3. The method as set forth in claim 2, wherein said part is a sintered aluminum alloy formed by powder-metallurgy.

4. The method as set forth in claim 2, wherein said period is about one half an hour.

5. The method of forming a porous layer on a wrought aluminum alloy body comprising the steps of coating the body with a loose mixture of aluminum and copper powder having a copper content of about 1 to 5% by weight, and heating the combination in a furnace at a temperature of about 625° to 630° C. for about one half hour to form a porous adherent structure on said body.

References Cited by the Examiner

UNITED STATES PATENTS

| | | | |
|---|---|---|---|
| 2,251,410 | 8/1941 | Koehring et al. | 29—182.3 |
| 2,287,251 | 6/1942 | Jones | 75—200 |
| 2,289,658 | 7/1942 | Koehring | 29—182.3 |
| 2,299,192 | 10/1942 | Tormyn | 29—182.3 |
| 2,350,179 | 5/1944 | Marvin | 29—182.3 |
| 2,418,881 | 5/1947 | Hensel et al. | 29—182.3 |
| 2,569,149 | 9/1951 | Brennon | 75—139 |
| 2,815,567 | 12/1957 | Gould et al. | 75—208 |

OTHER REFERENCES

Light Metals, March 1949, pp. 127–129.

CARL D. QUARFORTH, *Primary Examiner.*

REUBEN EPSTEIN, *Examiner.*